Jan. 13, 1931.  E. A. SPERRY  1,788,412
OIL ENGINE
Filed Jan. 24, 1922
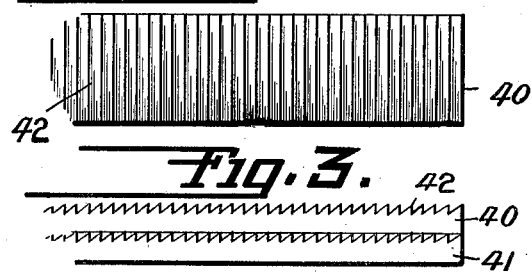
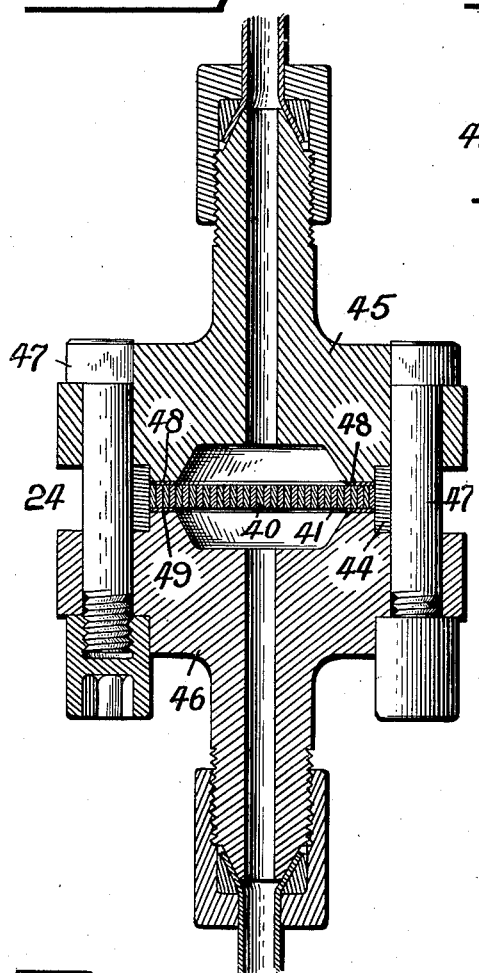
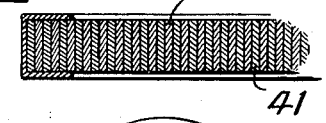
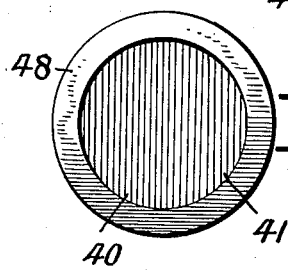
Inventor
*ELMER A. SPERRY.*
By his Attorney
*Herbert H. Thompson*

Patented Jan. 13, 1931

1,788,412

UNITED STATES PATENT OFFICE

ELMER A. SPERRY, OF BROOKLYN, NEW YORK, ASSIGNOR TO SPERRY DEVELOPMENT COMPANY, OF DOVER GREEN, DELAWARE, A CORPORATION OF DELAWARE

OIL ENGINE

Application filed January 24, 1922. Serial No. 531,329.

This invention relates to internal combustion engines of the auto-ignition type in which liquid fuel is injected under heavy pressure. In such engines the fuel is apt to pick up foreign matter after it is placed under pressure, such as in the pumps or high pressure pipes. It is the principal object of my invention to provide a strainer for said oil in advance of its injection into the combustion cylinder which will be sufficiently fine to separate out the small particles of foreign matter suspended in the fuel. It is essential that the pores of the strainer be of extreme fineness in order to filter effectively the foreign matter which is usually in the form of a suspension of light particles.

Referring to the drawings in which are shown what I now consider to be the preferred forms of my invention:

Fig. 1 is a sectional detail of the strainer employed with the high pressure oil.

Fig. 2 is a detail on a greatly enlarged scale of the face of one of the small plates making up the oil strainer, showing the minute serrations greatly magnified.

Fig. 3 is a magnified side view of two of said plates showing their relative positions.

Fig. 4 is a sectional view of a modified form of strainer.

Fig. 5 is a detached plan view of the strainer members before they are shrunk into the metal band.

While strainers for oil have of course been built for years, practically all of said strainers, as far as I am aware, operate under gravity or under very low pressure. I find, however, that such strainers are not adapted for my type of engine, since the oil is apt to pick up foreign matter after it is placed under pressure, such as in the pumps or high pressure pipes. The strainer I have shown at 24 consists of a plurality of very thin strips of metal 40, 41, etc., one side 42 of which is serrated like a very fine file, the serrated surfaces all facing the same way, as shown in Fig. 3. Such a strainer causes practically no reduction in the pressure of the oil as it passes through and at the same time filters out very effectively all foreign matter, a metallic strainer having special affinity for iron filings. The strips are firmly secured together by a metal band 44 shrunk or clamped therearound and further, by being clamped between members 45 and 46, forming the casing by bolts 47. Preferably, rings 48, 49 of copper or other soft metal are placed between the members 45, 46 and the strainer proper.

An alternative form of clamping the disks is shown in Fig. 4, a U shaped copper ring being placed around the disks.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention what I claim and desire to secure by Letters Patent is:

A strainer for oil pipes and the like, comprising a plurality of strips having serrated faces, and a ring having a U-shape section clamped around the edge of said strips to form a laminated circular disc with the laminations extending through the same.

In testimony whereof I have affixed my signature.

ELMER A. SPERRY.